May 9, 1967 J. D. HARMER 3,319,170
TRIGGER PULSE THRESHOLD LEVEL ADJUSTMENT CIRCUIT
Filed March 28, 1963
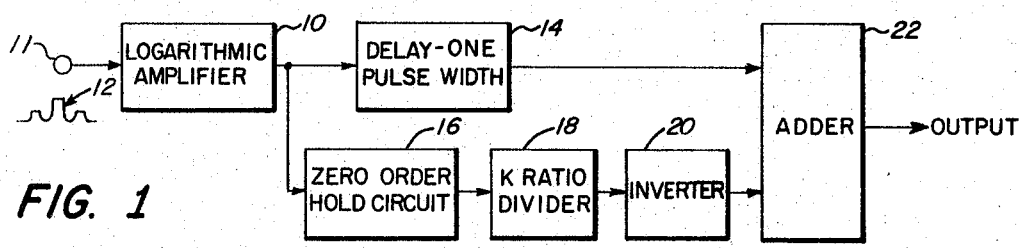
FIG. 1
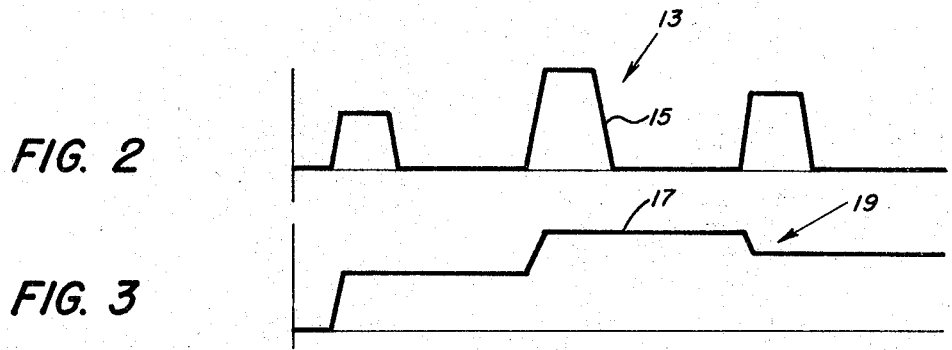
FIG. 2
FIG. 3
FIG. 4
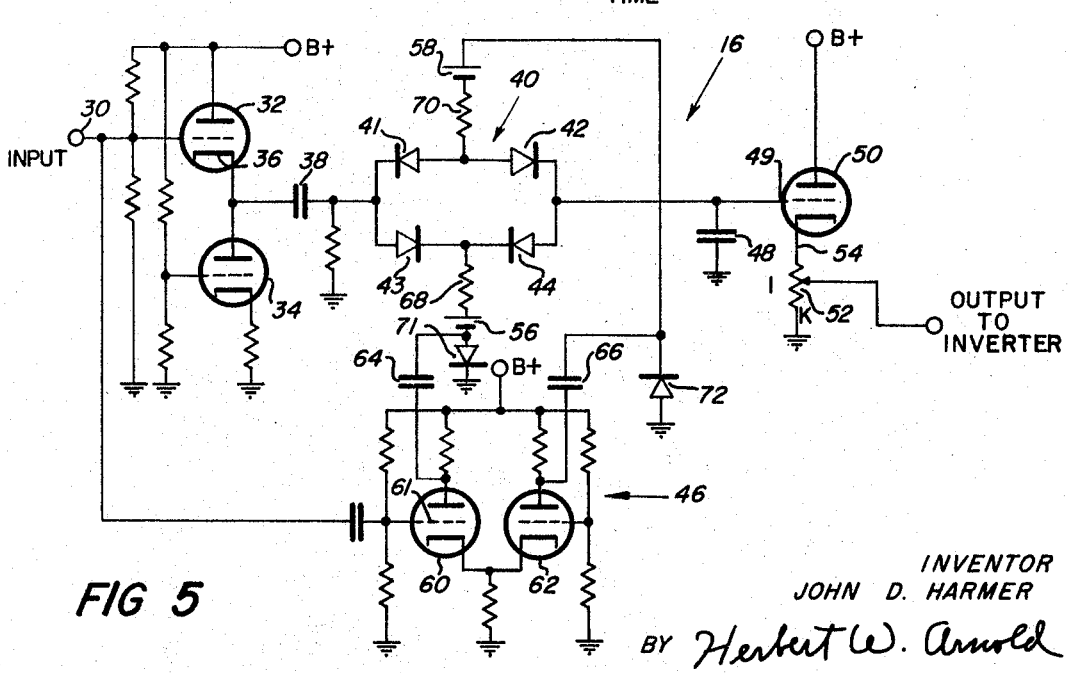
FIG 5
INVENTOR
JOHN D. HARMER
BY Herbert W. Arnold
ATTORNEY

United States Patent Office 3,319,170
Patented May 9, 1967

3,319,170
TRIGGER PULSE THRESHOLD LEVEL ADJUSTMENT CIRCUIT
John D. Harmer, Arlington, Mass., assignor to Raytheon Company, Lexington, Mass., a corporation of Delaware
Filed Mar. 28, 1963, Ser. No. 268,739
9 Claims. (Cl. 328—55)

This invention relates to electrical timing circuits, particularly those utilizing trigger pulses of varying amplitude and which aim to provide accurate trigger times at high speed and to within substantially the rise time of a single pulse.

In pulse communication radar and beacon transponder systems, it is frequently necessary to measure accurately the time interval between pulses. With pulses of variable amplitude caused, for example, by differences in the range between the transmitter and receiver, the timing circuit of the receiver is triggered by the front or leading edge of the return pulse at a fixed level dependent upon the trigger threshold level, and therefore at slightly different positions on the pulse front in time. Thus, for a fixed trigger level, a high amplitude, and hence wider trigger pulse tends to trigger the radar modulating circuit at an earlier time than that at which a low amplitude pulse of similar shape triggers the same circuit. In a radar or transponder system, this variation generates the effect of a range increment, and introduces uncertainty in range measurement. In the past, automatic gain control circuits have been incorporated in the pulse receiver amplifier to control the amplitude of received pulses to substantially the same value. When a constant trigger threshold is provided for such a circuit, the aforesaid delay variation due to pulse amplitude is diminished, although not completely removed. However, a plurality of pulses of a given signal are required for a feedback automatic gain control circuit to react, and in systems such as radars using widely spaced pulses, or communication links, using a small number of pulses in a word sequence, the timing circuit threshold is unable to adjust to respond correctly in the relatively short time of one pulse. Moreover, in certain systems, such as beacon transponders which might be required to respond to different radars at the same time, successive pulses may be at different amplitudes and under such conditions that instantaneous automatic gain control action is required which is difficult, if not impossible to achieve, particularly when response to, and compensation of, a single pulse of a few microseconds duration becomes necessary. It is, therefore, an object of the invention to provide an improved trigger circuit which provides accurate triggering in the presence of variable amplitude pulses and at times substantially less than the period of time taken for a single pulse.

In accordance with the invention, a circuit which compensates for differences in the instant of triggering on a signal or pulse due to variation in pulse amplitude is provided preferably by feeding the signal or pulse through a circuit having a logarithmic characteristic in which the front and trailing edge of the pulse become substantially linear. The pulse output from said amplifier circuit is delayed and an open loop control circuit is provided which utilizes a fixed fraction of the pulse amplitude to control the amplitude of the delayed pulse. This is achieved by adjusting the trigger pulse threshold level during delay of the trigger pulse to a fixed fraction, K, of the peak amplitude of the pulse output from the logarithmic circuit. With this arrangement, the time on the leading edge or pulse front at which triggering occurs becomes the same for pulses of different amplitudes and the threshold circuit operates on the pulse amplitude within the short time of approximately the length of the single pulse being operated upon. In particular, the pulse adjusting loop control circuit comprises a zero order hold circuit which develops an automatic bias level depending upon pulse amplitude. This bias level is divided by the required K factor, which is the ratio of the threshold level to peak pulse amplitude. The bias level, after being adjusted by the K factor, is inverted and fed to an adder circuit where it is used to operate on the delayed pulse with a fixed fraction of its own amplitude as it comes out of the delay line. The automatic bias level set by the loop control circuit is thus subtracted from the delayed pulse. The trigger pulse level is maintained by the zero order hold circuit substantially until the next pulse arrives, at which time the circuit is unclamped and readjusted. In this manner, the bias level and control signal from the loop circuit is dependent upon the height of the input trigger pulse and said trigger pulse, after being delayed, is operated upon with a fixed portion of its own amplitude. This arrangement removes the variation in the instant of triggering for pulses of the same general shape but different amplitudes and it is capable of operating on single widely spaced pulses.

Other objects and advantages of the invention will be more clearly understood by the reference to the following detailed description taken in conjunction with the accompanying drawing, in which:

FIG. 1 is a schematic diagram of an embodiment of the invention;

FIG. 2 is a diagram showing the waveform of the output from the logarithmic amplifier;

FIG. 3 is a diagram showing the output from the zero order hold circuit;

FIG. 4 is a diagram showing the variable threshold trigger pulse output; and

FIG. 5 is a schematic diagram of a typical zero order hold circuit.

Referring to FIG. 1, there is shown a logarithmic amplifier 10 having an input terminal 11 which accepts an input pulse signal of variable amplitude pulses, such, as, for example, pulse signal 12, from a signal source such as a receiver, not shown. The logarithmic amplifier produces output pulses of diminished amplitude variation and having approximately linear rise and fall characteristics. Pulses of this type are shown in waveform 13 of FIG. 2, each of which has a leading edge of substantially the same shape, even through their amplitudes differ. Thus, the logarithmic amplifier reduces the range of amplitude of pulses and also provides output pulses which are comparable in shape to each other, even though input pulses of comparable shape and greatly differing amplitudes are applied. While the input pulses to the logarithmic amplifier have approximately exponential characteristics, the output pulses from the logarithmic amplifier have linear rise and fall times. A typical logarithmic amplifier block diagram is shown in Fig. 21.4, page 584, and a typical logarithmic circuit diagram is shown in Fig. 21.16, page 595 of volume 23 of the Radiation Laboratory Series entitled, "Microwave Receivers," published by McGraw-Hill Company, Incorporated, 1948.

The output of logrithmic amplifier 10 is connected to a delay line 14 and also to a zero order hold circuit 16. Delay line 14 delays the input pulse or at least the time required for the output of the zero order hold circuit to become substantially constant in response to a new pulse input. This is in order to permit the loop control circuit, which includes the zero order hold circuit 16, to provide the necessary bias to operate on the delayed pulse as it emerges from delay line 14. The zero order hold circuit 16 provides an output signal, as shown in FIG. 3, which is adjusted to the amplitude of the input pulse and holds that particular amplitude until the succeeding pulse arrives, when it becomes readjusted to the new amplitude level of said succeeding pulse. The reason for holding this voltage level is so that, after being appropriately divided into a particular fixed fraction of its amplitude in a ratio of K divider 18, it can be used to subtract a fixed fraction of the amplitude of a pulse from the delay circuit 14. For the subtraction process, an inverter circuit 20 and a well-known adder circuit 22 are connected in series with zero hold circuit 16. Thus, the output trigger pulses from the adder circuit operate a subsequent utilization device, such as, for example, a trigger circuit, at an instant of time which is always an identical time interval, $t_0$, ahead of the crest of the pulse front, as shown in FIG. 4. In this manner, substantially no variation in trigger time results in, for example, pulses 24, 25, and 26 of varying amplitudes.

FIG. 3 shows the output waveform from the zero order hold circuit 16 which holds the individual amplitudes of the pulses from the logarithmic amplifier 10 and feeds these prolonged pulses into the K ratio divider 18. In this embodiment, this divider comprises a fixed potentiometer which is adjusted to provide a fixed fraction of the input to the divider. The K ratio may be, for example, .5 or any other value from substantially zero to one selected to determine the fraction of altitude up the pulse front at which it is desired that triggering occur. For example, triggering occurs at approximately .5, the distance up the pulse front when a K ratio of .5 is selected. The output of the K ratio divider 18 is fed to a well-known inverter circuit 20, so that the K ratio output will be subtracted in adder circuit 22 from the delayed pulse signal output of delay line 14. Thus, the loop control circuit, which comprises the zero order hold circuit, K ratio divider, and inverter, automatically biases each trigger pulse from delay line 14 so that sequentially the entire level of each pulse is displaced by an amount which is K times the amplitude of such pulse. Thus, as the pulse amplitude is either less or greater than the previous pulse, the bias level is lifted or depressed, respectively, so that the pulse front crosses the threshold or zero axis shown in FIG. 4 at the same instant of time, $t_0$, ahead of the crest of the pulse front.

It should be understood that the logarithmic amplifier 10 may be either omitted or replaced by a linear amplifier when the relative amplitudes of the linear pulses do not vary at an excessive ratio, for example, greater than ten to one, which would tend to limit the precision of the operation of the zero order hold circuit and the trigger or utilization devices which are fed by this system.

FIG. 5 is a schematic diagram of a typical zero order hold circuit in which an output signal is provided, the magnitude of which is equivalent to the amplitude of the previous input received. The output voltage changes to a new level only when the next input pulse is received. In the embodiment shown herein, the input pulse at terminal 30 is fed through a cathode follower circuit including a cathode follower tube 32 and a constant current tube 34 connected to cathode 36 of tube 32. This circuit provides a pulse drive of very low impedance by way of coupling capacitor 38 to a gating circuit 40 comprising diodes 41, 42, 43, and 44. This low impedance pulse drive results from the high current gain of tube 32 and the high plate impedance of serially connected tube 34. By providing a high plate impedance, the current tube 34 becomes substantially independent of the voltage on its plate. This enables cathode follower tube 32 to operate in a high gain region, which provides a low impedance output which is unaffected by loading of the subsequent circuit. Gating diodes 41 to 44 operate as a high current capacity switch controlled by a gating amplifier 46 to charge a holding capacitor 48 during the time the gating diodes are rendered conducting. This is for substantially the duration of the input pulse. When the gating diodes are rendered nonconducting by an output from gating amplifier 46, the charge on holding capacitor 48 remains substantially constant, since the diodes 42 and 44 are nonconducting and present a high impedance to current flow. Also, the input impedance at grid 49 of output cathode follower tube 50, which with potentiometer 52 provides the ratio of K divider stage 18, is also great enough so that substantially no leakage of voltage occurs from capacitor 48. In this manner, a pulse 15 from waveform 13 of FIG. 2 is prolonged to provide the prolonged pulse 17 of waveform 19 of FIG. 3, which is the output at cathode 54 of tube 50. As noted previously, the potentiometer 52 is preset to the desired value of K so that the output waveform is a fixed fraction of the output waveform 19 in FIG. 3. Thus, the threshold level shown in FIG. 4 is adjusted so that the time interval, $t_0$, remains constant for pulses of any amplitude, such as pulses 24, 25, and 26.

To isolate the charging voltage to capacitor 48 from the gating signal output from gating amplifier 46 to diode switch 40, a balanced push-pull gating amplifier 46 and diode switch 40 are provided. In the embodiment shown, the balanced push-pull gating amplifier 46 is driven by a pulse from input terminal 30, which may be connected to logarithmic amplifier 10. Bias sources 56 and 58 are poled to apply bias to the diode network 40 so that when no pulse is applied to gating amplifier 46, the diodes 41 to 44 are reverse-biased and rendered nonconducting. Push-pull amplifier 46 comprises tubes 60 and 62 connected as a differential amplifier. The balanced outputs from differential gating amplifier 46 are applied through coupling capacitors 64 and 66, resistors 68 and 70 to diodes 43 and 44 and to diodes 41 and 42, respectively. Thus, upon application of a positive input pulse to grid 61 of tube 60, a negative output is applied through capacitor 64 and a positive output of equal amplitude is applied through capacitor 66, and then to the respective diode pairs, so as to cause all four diodes to conduct, which provides current flow in either direction from capacitor 38 to capacitor 48. Upon conclusion of the positive input pulse to tube 60, the outputs at capacitors 64 and 66 become equal, and current ceases to flow through resistors 68 and 70 and through the diodes 41 to 44. The bias sources 56 and 58 apply a reverse bias to these diodes so that they become nonconducting, thereby holding the charge on capacitor 48 substantially constant and permitting only negligible leakage of charge from capacitor 48 back through the network. Thus, the diode network, when open, performs an isolating function between capacitors 38 and 48 and at no time does current leakage from the gating amplifier to capacitor 48 occur. Diodes 71 and 72 conduct after completion of the gating pulse at grid 61 to permit bias sources 56 and 58 to charge the residual capacitance in the diodes 41 to 44 so as to place them in a reverse bias or nonconducting condition during prolongation of the charge on capacitor 48.

This invention is not limited to the particular details of construction, materials and processes described as many equivalents will suggest themselves to those skilled in the art. Accordingly, it is desired that this invention not be limited to the particular details of the embodiments disclosed except as defined by the appended claims.

What is claimed is:
1. In combination:
means for delaying a signal;
means for sampling a signal prior to its entry into said delaying means;
means for prolonging the time interval of said sampled signal;
means for inverting said prolonged signal;
and means for subtracting said inverted prolonged signal from said delayed signal according to a predetermined fraction of the amplitude of said sampled signal.

2. In combination:

an amplifier circuit in which the relative shape of signals passing therethrough is constant;

means for delaying the signal output of said amplifying circuit;

a loop control circuit connected to the input of said delay means including means for providing a control voltage having a predetermined fraction of the peak signal amplitude in response to the amplitude of a signal entering said delay means;

and means for combining said control voltage and said delayed signal according to said predetermined fraction of the peak signal amplitude.

3. In combination:

a pulse amplifier circuit having a characteristic in which the relative shape of pulses passing therethrough remains constant;

means for delaying the pulse output of said amplifying circuit;

means for sampling a signal prior to its entry into said delay means;

means for prolonging the time interval of said sample signal beyond its width;

means for inverting said prolonged signal;

and means for combining said inverted signal with a delayed signal from said signal delaying means and adjusting the threshold level of said delayed signal to a predetermined level.

4. In combination:

an amplifier circuit having a characteristic in which the relative shape of signals passing therethrough is substantially constant;

means for delaying the signal output of said amplifying circuit;

and a loop control circuit for operating on said delayed signal including means for providing a control voltage having a predetermined fraction of the output of said amplifying circuit;

means for inverting said control voltage;

and means for subtracting said control voltage from a signal output from said signal delaying means according to a preset threshold level.

5. In combination:

means for delaying a signal at least one signal width;

means for sampling a signal prior to its entry into said delay means;

means for prolonging the time interval of said sampled signal;

means for inverting said prolonged signal;

and means for combining said inverted signal with said delayed signal and biasing said delayed signal to a predetermined threshold substantially determined by the amplitude of said sampled signal at the input to said delay means.

6. In combination:

a pulse amplifying circuit having the characteristic in which the front and trailing edges of a pulse passing therethrough become substantially linear;

means for delaying the pulse output of said amplifying circuit;

a loop control circuit operating on said delayed pulse with a fixed fraction of its amplitude upon entering said pulse delaying means including means for prolonging the output pulse from said amplifying circuit beyond a single pulse width;

means for inverting the amplitude of said prolonged pulse;

and means for adding the output of said prolonged pulse to said delayed pulse according to a fixed fraction of the amplitude of the signal entering said signal delaying means.

7. A threshold adjustment circuit including a delay line for delaying a pulse passing therethrough;

an amplitude holding circuit connected to the input to said delay line and prolonging an input pulse to said delay line beyond the time interval of a single pulse;

a divider circuit connected to said amplitude holding circuit for providing a signal which is a predetermined fraction of the amplitude of a pulse at the input to said delay line;

and means for inverting the output signal from said divider circuit and adding said inverted output signal to a delayed pulse emerging from said delay line to adjust the threshold level of said delayed pulse.

8. A threshold level adjustment circuit including means for delaying each pulse of a series of pulses;

means connected to the input of said pulse delaying means for prolonging the peak amplitude of one of said pulses until that of a succeeding pulse in said series;

means for providing an output signal from said prolonged pulse having an amplitude which varies according to a preset ratio of its threshold level to peak amplitude of the input pulse to said delaying means;

and means for inverting said output signal from said prolonged pulse and combining said inverted output signal with a pulse from said delay means to maintain the threshold level of each pulse of a series of pulses substantially constant.

9. A threshold adjustment circuit comprising:

means for delaying a series of pulses;

means connected to the input of said delay means for prolonging the peak amplitude of one of said pulses until the arrival of a succeeding pulse of said series of pulses;

and means for inverting said prolonged pulse subtracting said inverted prolonged pulse from the corresponding pulse emerging from said delay means according to a predetermined fraction of the amplitude of said pulse prior to its entry to said delay means.

References Cited by the Examiner

UNITED STATES PATENTS 3,076,145  1/1963  Copeland et al. _____ 328—117

References Cited by the Applicant

UNITED STATES PATENTS 2,728,852  12/1955  Moran.
2,951,987  9/1960  Longmire.

ARTHUR GAUSS, *Primary Examiner.*

S. D. MILLER, *Assistant Examiner.*